United States Patent [19]
Vallalla et al.

[11] Patent Number: 5,373,331
[45] Date of Patent: Dec. 13, 1994

[54] EYEGLASS AND LENS INTERCHANGE STRUCTURE

[76] Inventors: Rosalie G. Vallalla; Anthony E. Vallalla, both of P.O. Box 118, Morrisdale, Pa. 16858

[21] Appl. No.: 12,766

[22] Filed: Feb. 3, 1993

[51] Int. Cl.⁵ ........................... G02C 7/08; G02C 1/08
[52] U.S. Cl. ........................ 351/57; 351/86; 351/91; 351/92; 351/156
[58] Field of Search ............... 351/47, 57, 58, 83, 351/86, 90, 91, 92, 155, 156

[56] References Cited

U.S. PATENT DOCUMENTS

| | | | |
|---|---|---|---|
| 2,479,754 | 8/1949 | Marks | 351/92 |
| 2,749,800 | 6/1956 | Gagnon | 351/91 |
| 2,781,693 | 2/1957 | Brumby | 351/91 |
| 2,946,258 | 7/1960 | Lindblom | 351/91 |
| 3,011,400 | 12/1961 | Neary | 351/91 |
| 3,040,623 | 6/1962 | Lauber | 351/91 |
| 3,542,460 | 11/1970 | Smith et al. | 351/92 |
| 3,801,189 | 4/1974 | Bolle | 351/92 |
| 4,176,921 | 12/1979 | Matthias | 351/86 |
| 4,479,703 | 10/1984 | Enghofer | 351/156 |
| 4,822,158 | 4/1989 | Porsche | 351/57 |
| 5,048,944 | 9/1991 | Porsche | 351/57 |

FOREIGN PATENT DOCUMENTS 103256 2/1924 Switzerland ............ 351/90

Primary Examiner—Richard A. Bertsch
Assistant Examiner—Howard R. Richman
Attorney, Agent, or Firm—E. Michael Combs

[57] ABSTRACT

A lens includes a central nose frame having a top wall and spaced first and second side walls directed to the top wall at predetermined obtuse included angles, with first and second cup-shaped lens frames mounted to opposed sides of the nose frame to receive removable lens members respectively therewithin. First and second eyeglass legs are hingedly mounted to the respective first and second lens frames and arranged for abutment, in a complementary manner, the first and second sides of the nose frame, to include a lock bar pivotally mounted to the nose frame to extend over the first and second nose frame sides, as well as first ends of the first and second lock legs to secure the lock legs and the associated lenses within the frame structure.

1 Claim, 4 Drawing Sheets

EYEGLASS AND LENS INTERCHANGE STRUCTURE

BACKGROUND OF THE INVENTION

1. Field of the Invention

The field of invention relates to eyeglass structure, and more particularly pertains to a new and improved eyeglass and lens interchange structure wherein the same permits the selective replacement of lenses within an eyeglass frame member.

2. Description of the Prior Art

Eyeglass frames, and particularly eyeglass frames to secure removable lenses, are available in the prior art and indicated in U.S. Pat. Nos. 4,176,921; 4,822,158; 5,048,944.

The instant invention attempts to overcome deficiencies of the prior art by providing for a central frame member having lock legs to permit the use of rigid cup-shaped frame members to secure lenses therewithin in a geometrically secure manner and in this respect, the present invention substantially fulfills this need.

SUMMARY OF THE INVENTION

In view of the foregoing disadvantages inherent in the known types of eyeglass apparatus now present in the prior art, the present invention provides an eyeglass and lens interchangeably lenses within a primary frame member. As such, the general purpose of the present invention, which will be described subsequently in greater detail, is to provide a new and improved eyeglass and lens interchange structure which has all the advantages of the prior art eyeglass apparatus and none of the disadvantages.

To attain this, the present invention provides a lens including a central nose frame having a top wall and spaced first and second side walls directed to the top wall at predetermined obtuse included angles, with first and second cup-shaped lens frames mounted to opposed sides of the nose frame to receive removable lens members respectively therewithin. First and second eyeglass legs are hingedly mounted to the respective first and second lens frames and arranged for abutment, in a complementary manner, the first and second sides of the nose frame, to include a lock bar pivotally mounted to the nose frame to extend over the first and second nose frame sides, as well as first ends of the first and second lock legs to secure the lock legs and the associated lenses within the frame structure.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved eyeglass and lens interchange structure which has all the advantages of the prior art eyeglass apparatus and none of the disadvantages.

It is another object of the present invention to provide a new and improved eyeglass and lens interchange structure which may be easily and efficiently manufactured and marketed.

It is a further object of the present invention to provide a new and improved eyeglass and lens interchange structure which is of a durable and reliable construction.

An even further object of the present invention is to provide a new and improved eyeglass and lens interchange structure which is susceptible of a low cost of manufacture with regard to both materials and labor, and which accordingly is then susceptible of low prices of sale to the consuming public, thereby making such eyeglass and lens interchange structure economically available to the buying public.

Still yet another object of the present invention is to provide a new and improved eyeglass and lens interchange structure which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
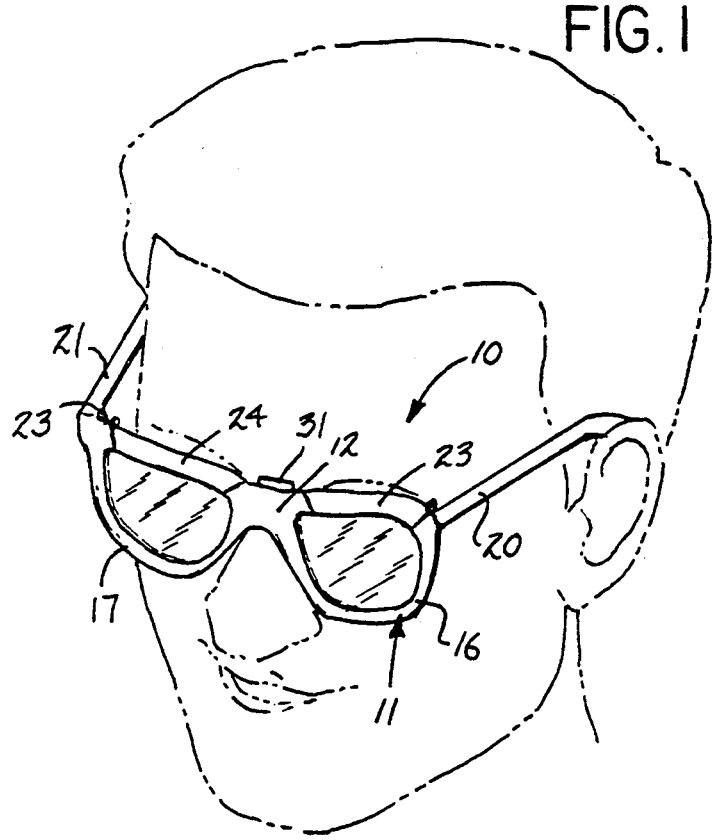
FIG. 1 is an isometric illustration of the invention mounted to an individual.

With reference now to the drawings, and in particular to FIGS. 1 to 11 thereof, a new and improved eyeglass and lens interchange structure embodying the principles and concepts of the present invention and generally designated by the reference numeral 10 will be described.

More specifically, the eyeglass and lens interchange structure 10 essentially comprises a frame member 11, having a central nose frame 12, including a nose frame top wall 13. The top wall extends into spaced respective nose frame first and second side walls 14 and 15 to the top wall at a predetermined obtuse included angle therebetween. A first cup-shaped lens frame 16 and a second cup-shaped lens frame 17 are mounted to the central nose frame 12 in adjacency to one another, with the first lens frame 16 having a first eyeglass leg 20 pivotally mounted thereto about a first leg hinge 22, with a second eyeglass leg 21 hingedly mounted to the second lens frame 17 about a second leg hinge 22a. A first lens lock leg 23 includes a first lock leg first end 27 spaced from a first lock leg 28, with the first lock leg first end 27 arranged for contiguous and coextensive engagement with the nose frame first side wall 14 and the first lock leg second end 28 hingedly mounted to the first cup-shaped lens frame 16 about a first lock leg hinge 25. A second lock leg hinge 26 includes a second lock leg first end 29 arranged for contiguous and coextensive communication with the nose frame second side wall 15, and a second lock leg second end hingedly mounted to the second cup-shaped lens frame 17 about a second lock leg hinge 26.

Figure 2:
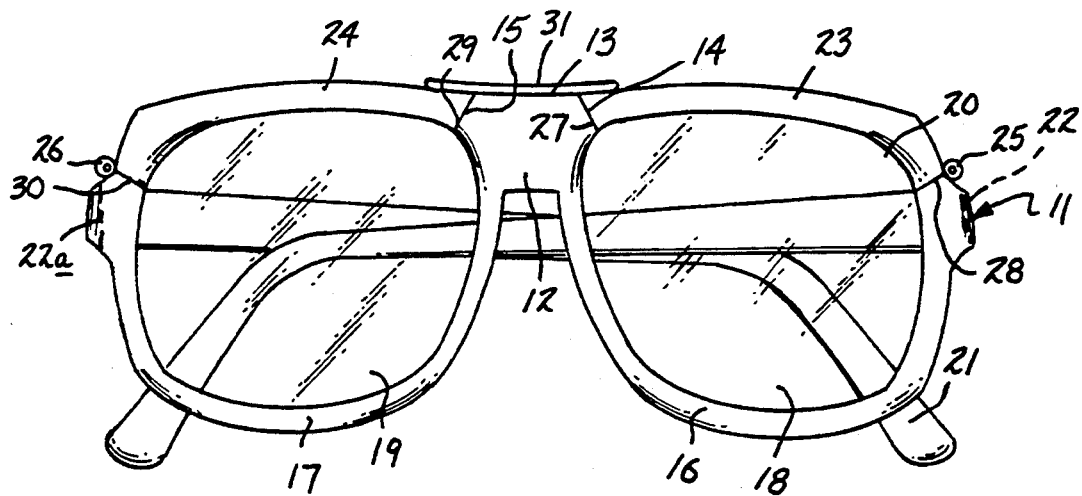
FIG. 2 is an orthographic frontal view of the invention.
Figure 3:
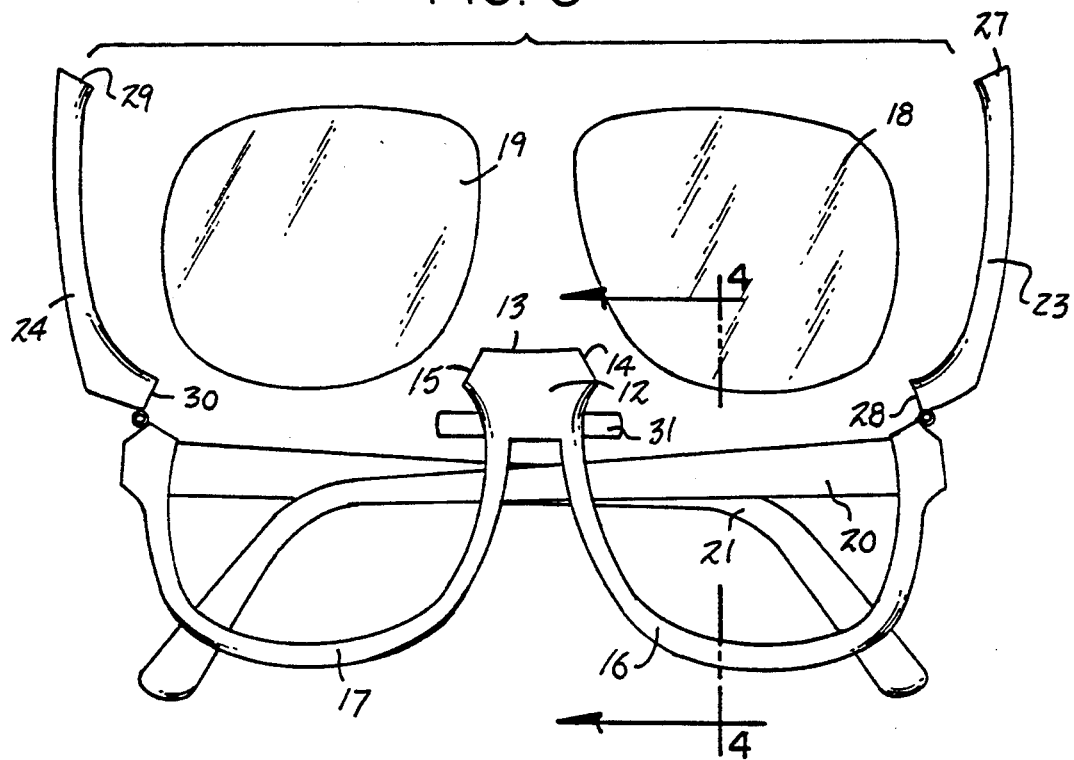
FIG. 3 is an orthographic front view of the invention in exploded view.
Figure 4:
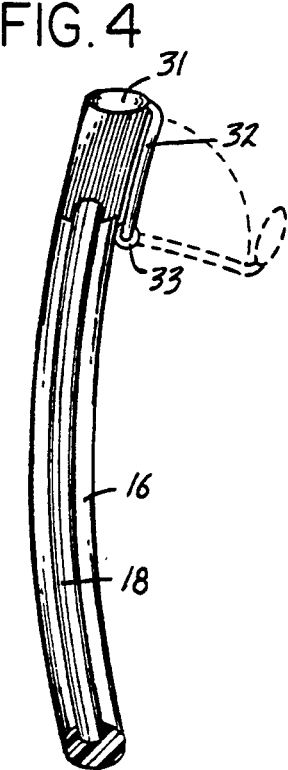
FIG. 4 is an orthographic view, taken along the lines 4—4 of FIG. 3 in the direction indicated by the arrows.

A lock bar 31 is provided arranged for engagement to extend over the nose frame first side wall and the nose frame second side wall in abutment with the nose frame top wall 13. The lock bar 31, when in contiguous communication with the nose frame top wall 13, further extends over a first intersection of the nose frame first side wall 14 and the first lock leg first first end 27 at a second intersection of the nose frame second side wall 15 and the second lock leg first end 29, as indicated in FIG. 2 for example. The lock bar 31 includes lock bar support legs 32 fixedly mounted to the lock bar and extending from the lock bar to a bearing shaft 33 rotatably mounting the support legs 32 to permit pivoting of the lock bar 31 relative to the nose frame top wall 13 for selective engagement thereover.

Figure 10:
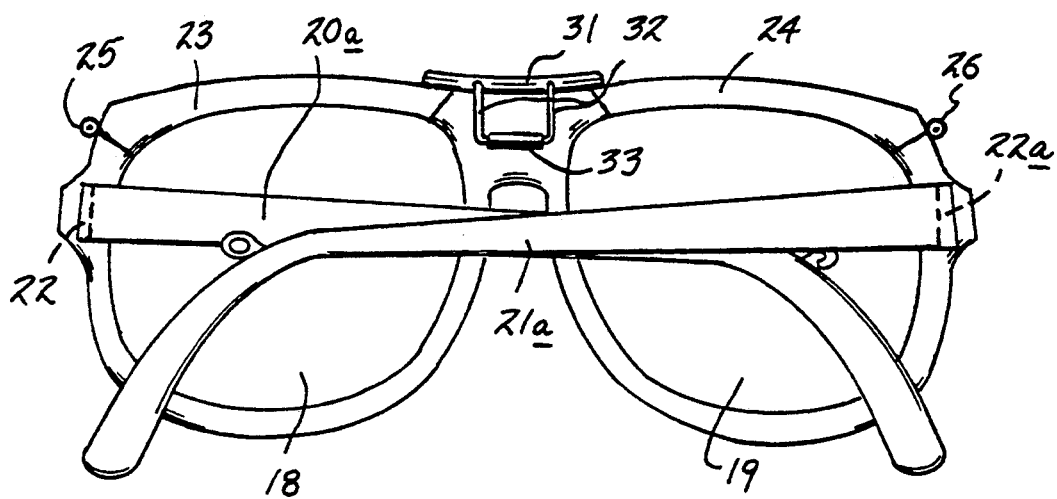
FIG. 10 is an orthographic rear view of the invention arranged to include modified eyeglass legs.
Figure 11:
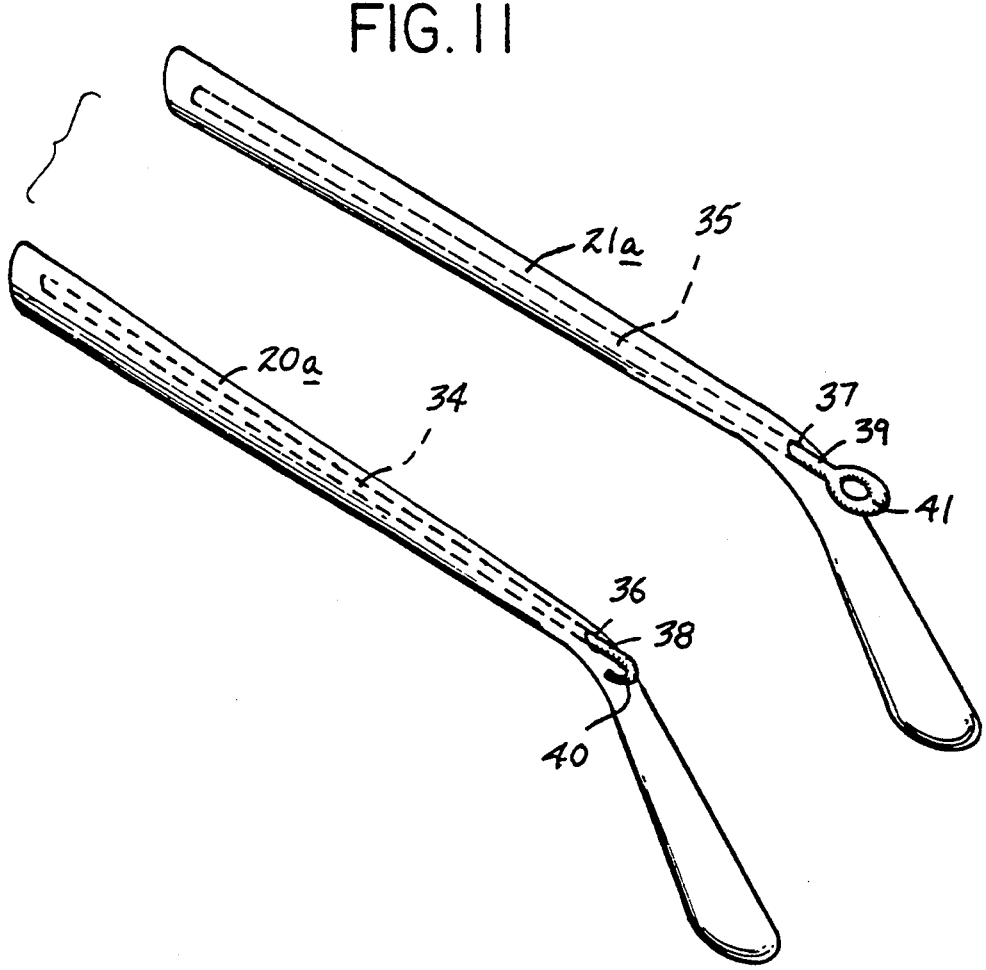
FIG. 11 is an orthographic view of the modified eyeglass legs for use as indicated in FIG. 10.

The FIGS. 10 and 11 indicates the use of modified first and second eyeglass legs 20a and 21a respectively, with the first modified leg having a first elongate leg cavity 34 therewithin, and the second modified leg 21a having a second elongate leg cavity 35 therewithin. The first cavity 34 includes a first cavity entrance 36 spaced from the first leg hinge 22, and the second cavity 35 having a second cavity entrance 37 spaced from the second leg hinge 22a. Within the first cavity 34 is a first elastomeric cord 38 having a hook member 40 projecting beyond the first cavity entrance 36, and a second elastomeric cord 39 directed and received within the second leg cavity 35, having a loop member 41. In this manner, the first and second elastomeric cords 38 and 39 are stretched for extending about an individual's head for securement thereabout, with the hook and loop members 40 and 41 arranged for engagement relative to one another to fasten and secure the first and second elastomeric cords 38 and 39 about an individual's head to insure securement of the eyeglass frame structure thereabout.

Figure 5:
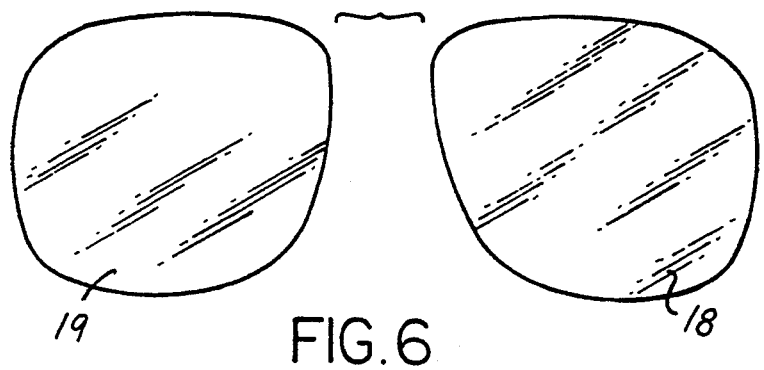
FIGS. 5, 6, and 7 are orthographic respective views of replaceable lenses arranged for positioning within the frame member of the invention.
Figure 6:
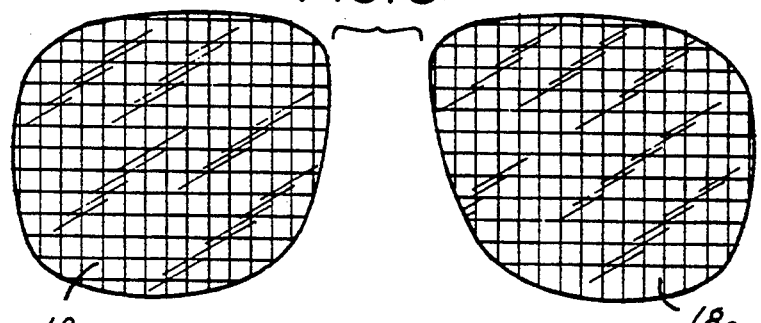
Figure 7:
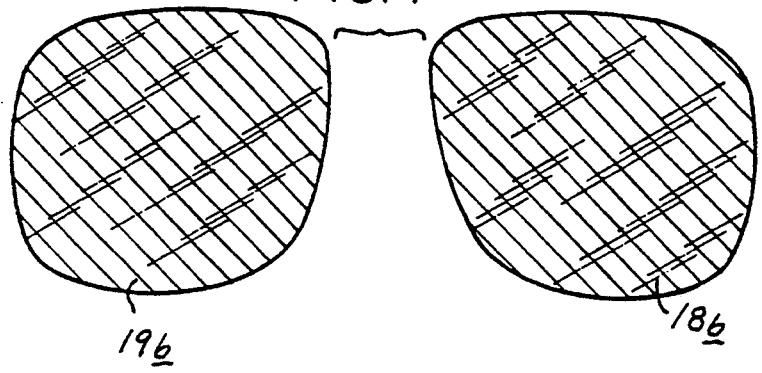
Figure 8:
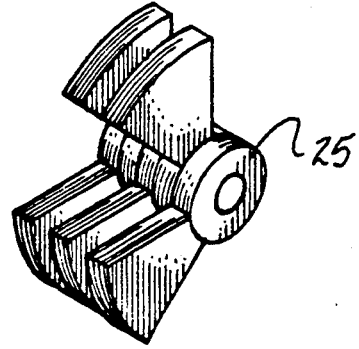
FIG. 8 is an isometric illustration of a hinge member for use with the lock legs of the invention.
Figure 9:
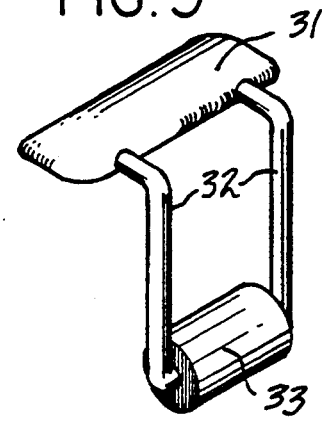
FIG. 9 is an isometric illustration of the lock bar structure of the invention.

The FIGS. 5, 6, and 7 indicate the respective use of clear, fog lenses, and sun-tinted lenses for selective use. It should be noted that such lenses are not of limiting example, but are simply exemplary to indicate that lenses 18, 19, 18a, 19a, 18b, and 19b of identical construction may be positioned within the respective first and second cup-shaped lens frames 16 and 17.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An eyeglass and lens interchange structure, comprising, a frame member, the frame member having a central nose frame, the central nose frame including a top wall and a first side wall intersecting the top wall at a predetermined obtuse included angle, and the nose frame including a second side wall intersecting the top wall spaced from the first side wall at said predetermined obtuse included angle, and a first cup-shaped lens frame mounted to the central nose frame, and a second cup-shaped lens frame mounted to the central nose frame, and a first lens positioned within the first cup-shaped lens frame and a second lens positioned within the second cup-shaped lens frame, and a first eyeglass leg and a second eyeglass leg, the first eyeglass leg is hingedly mounted to the first cup-shaped lens frame about a first leg hinge, the second eyeglass leg is hingedly mounted to the second cup-shaped lens frame about a second leg hinge, and a first lock leg hingedly mounted to the first cup-shaped lens frame, a second lock leg hingedly mounted to the second cup-shaped lens frame, and lock means mounted to the nose frame for securement of the first lock leg and the second lock to the nose frame, and the first lock leg includes a first lock leg first end and a first lock leg second end, the first lock leg first end includes a first lock leg hinge positioned in adjacency to the first leg hinge, and the first lock leg second end arranged for contiguous and coextensive communication with the first side wall at a first intersection, and the second lock leg including a second lock leg first end and a second lock leg second end, with the second lock leg first end having a second lock leg hinge positioned in adjacency to the second leg hinge pivotally mounting the second lock leg to the second cup-shaped lens frame and the second lock leg second end arranged for contiguous and coextensive communication with the nose frame second side wall at a second intersection, and the lock means includes a lock bar, the lock bar arranged for contiguous communication with the nose frame top wall and extending over the first intersection and the second intersection in simultaneous communication with the nose frame top wall, the first lock leg, and the second lock leg, wherein the lock bar includes at least one support leg, and a bearing shaft, the bearing shaft fixedly mounted to the central nose frame, and the at least one support leg rotatably mounted within the bearing shaft to permit pivoting of the lock bar relative to the nose frame top wall, and the first eyeglass leg includes a first elongate leg cavity directed therethrough, the second eyeglass leg includes a second elongate cavity directed therethrough, the first leg cavity includes a first cavity entrance spaced from the first leg hinge, the second elongate cavity includes a second elongate cavity entrance spaced from the second leg hinge, and a first elastomeric cord directed and coextensive with the first elongate leg cavity projecting beyond the first cavity entrance, and a second elastomeric cord directed coextensively through the second elongate leg cavity projecting beyond the second cavity entrance, and the first elastomeric cord including a hook member, the second elastomeric cord including a loop member, wherein the hook member is positioned exteriorly of the first eyeglass leg and the loop member is positioned exteriorly of the second eyeglass leg, wherein the hook member and the loop member are arranged for securement relative to one another about an individual's head for securement of the frame member to the individual's head.

* * * * *